T. F. DRAKE.
FLAIL.

No. 173,216.                Patented Feb. 8, 1876.

WITNESSES:
E. Wolff.
J. Goethals

INVENTOR:
T. F. Drake
BY
ATTORNEYS.

N. PETERS, PHOTO-LITHOGRAPHER, WASHINGTON, D. C.

UNITED STATES PATENT OFFICE.

THEODORE F. DRAKE, OF GREAT VALLEY, NEW YORK.

IMPROVEMENT IN FLAILS.

Specification forming part of Letters Patent No. 173,216, dated February 8, 1876; application filed January 3, 1876.

*To all whom it may concern:*

Be it known that I, THEODORE F. DRAKE, of Great Valley, Cattaraugus county, New York, have invented a new and Improved Flail, of which the following is a specification:

My invention consists of wires combined with the wood beater of a flail in such a manner that a few wires, arranged lengthwise of the flail, but at considerable intervals around it circumferentially, are made to act about as effectually as though the whole surface were shod with metal, which would make the flail too heavy.

Figure 1:
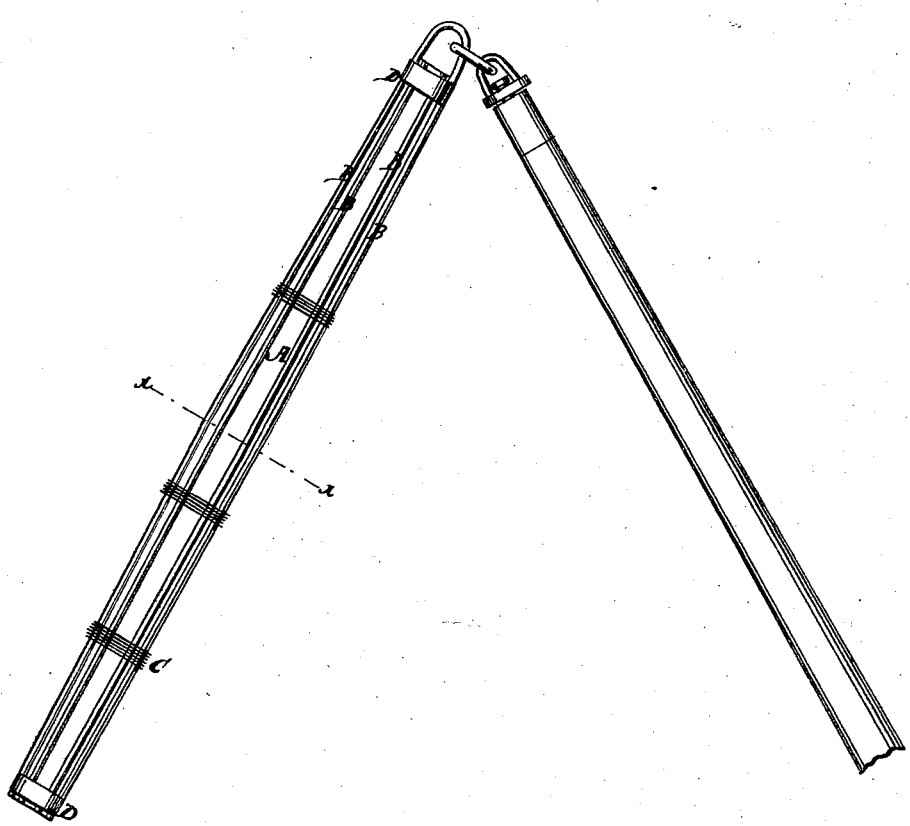
Figure 2:
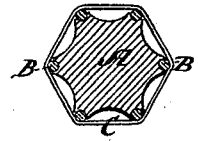

Figure 1 is a side elevation of a flail, the beater of which is contrived according to my invention, and Fig. 2 is a transverse section of the beater.

Similar letters of reference indicate corresponding parts.

A is the beater, of wood, which is fluted longitudinally, and which is, according to my invention, armed with a wire, B, in the face of each rib C, and extending the whole length of the beater, said wires being secured by fine binding-wires $c$, wound tightly around and securely fastened at suitable points along the beater between the ends, and at the ends said wires are secured by metal bands D; but the method of fastening the wires may be modified at will, and the beater may be fluted or not.

Having thus described my invention, I claim as new and desire to secure by Letters Patent—

The combination of wires B with the beater of a flail, substantially as specified.

THEODORE F. DRAKE.

Witnesses:
H. D. DIDCOCK,
D. H. PATTERSON.